US012432100B2

(12) United States Patent
Hu et al.

(10) Patent No.: US 12,432,100 B2
(45) Date of Patent: Sep. 30, 2025

(54) PERFORMING A TWO-STAGE DECOMPOSITION ON A FOUR BY FOUR HERMITIAN MATRIX ASSOCIATED WITH A WIRELESS COMMUNICATION SIGNAL ANALYSIS

(71) Applicant: QUALCOMM Incorporated, San Diego, CA (US)

(72) Inventors: Wenquan Hu, Espoo (FI); Srikant Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 18/190,027

(22) Filed: Mar. 24, 2023

(65) Prior Publication Data

US 2024/0323058 A1  Sep. 26, 2024

(51) Int. Cl.
*H04L 25/02* (2006.01)
*G06F 17/16* (2006.01)

(52) U.S. Cl.
CPC .......... *H04L 25/0248* (2013.01); *G06F 17/16* (2013.01)

(58) Field of Classification Search
CPC .... H04L 25/0248; H04B 7/0434; G06F 17/16
See application file for complete search history.

(56) References Cited

U.S. PATENT DOCUMENTS

| 2006/0040706 | A1* | 2/2006 | Wu | H01Q 3/2605 |
| | | | | 455/562.1 |
| 2006/0106902 | A1* | 5/2006 | Howard | H04L 25/0248 |
| | | | | 708/200 |
| 2010/0150279 | A1* | 6/2010 | Arar | H04B 7/0891 |
| | | | | 375/340 |
| 2011/0038433 | A1* | 2/2011 | Chen | H04L 25/03828 |
| | | | | 375/260 |

(Continued)

FOREIGN PATENT DOCUMENTS

EP  4020832 A1  6/2022

OTHER PUBLICATIONS

Deledalle C-A., et al., "Closed-form expressions of the eigen decomposition of 2 × 2 and 3 × 3 Hermitian matrices", HAL open science, Apr. 4, 2017, 4 Pages, XP093177071, section 2.
International Search Report and Written Opinion—PCT/US2024/017835—ISA/EPO—Jul. 4, 2024.

*Primary Examiner* — Benjamin H Elliott, IV
(74) *Attorney, Agent, or Firm* — Kevin M. Donnelly; Harrity & Harrity, LLP

(57) ABSTRACT

Various aspects of the present disclosure generally relate to wireless communication. Various aspects relate generally to determining information metrics associated with an eigenvalue decomposition (EVD) operation associated with a four by four Hermitian matrix. Some aspects more specifically relate to determining a scalar (e.g., an eigenvalue or an approximation of an eigenvalue) of the four by four Hermitian matrix and determining a shifted matrix by subtracting a product of the scalar and an identity matrix from the (Continued)

four by four Hermitian matrix. A QR decomposition may be performed on the shifted matrix to determine first derived information, representable by a three by three Hermitian matrix. An eigenvalue decomposition operation may be performed on the three by three Hermitian matrix to determine the eigenvalues and eigenvectors of the four by four Hermitian matrix.

27 Claims, 7 Drawing Sheets

(56) References Cited

U.S. PATENT DOCUMENTS

| | | | |
|---|---|---|---|
| 2011/0090945 A1* | 4/2011 | Yang | H04B 7/0617 |
| | | | 375/227 |
| 2014/0036655 A1* | 2/2014 | Zhang | H04B 7/0417 |
| | | | 370/329 |
| 2018/0239763 A1* | 8/2018 | Majumdar | G06F 16/951 |
| 2020/0411031 A1* | 12/2020 | Ito | G10L 21/0264 |
| 2022/0181791 A1* | 6/2022 | Venkatesan | H04B 7/0413 |
| 2022/0345186 A1* | 10/2022 | Zhang | H04B 7/0617 |
| 2023/0388157 A1* | 11/2023 | Shikida | H04L 25/0248 |
| 2024/0039603 A1* | 2/2024 | Ge | H04B 7/063 |
| 2024/0106517 A1* | 3/2024 | Hu | H04B 7/0854 |
| 2024/0323058 A1* | 9/2024 | Hu | H04L 25/0248 |

* cited by examiner

PERFORMING A TWO-STAGE DECOMPOSITION ON A FOUR BY FOUR HERMITIAN MATRIX ASSOCIATED WITH A WIRELESS COMMUNICATION SIGNAL ANALYSIS

FIELD OF THE DISCLOSURE

Aspects of the present disclosure generally relate to wireless communication and specifically, to techniques and apparatuses for performing a two-stage decomposition on a four by four Hermitian matrix associated with a wireless communication signal analysis.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Eigen value decomposition (EVD) can be used by network nodes in principal component analysis, transmission beamforming, and/or solving other matrix decompositions (e.g., singular value decomposition (SVD)), among other examples. In some cases, performing an EVD on a four by four matrix can be computationally complex, which may result in undesirable latency. In some cases, performing an EVD on a four by four Hermitian matrix can, due to computational complexity, produce inaccurate results.

SUMMARY

Some aspects described herein relate to a network node for wireless communication. The network node may include at least one memory and at least one processor communicatively coupled with the at least one memory. The at least one processor may be operable to cause the network node to receive signal information, associated with a wireless communication signal, that is representable by a four by four Hermitian matrix. The at least one processor may be operable to cause the network node to determine an information metric associated with the signal information, wherein the determination of the information metric includes.

Some aspects described herein relate to a method of wireless communication performed by a network node. The method may include receiving signal information, associated with a wireless communication signal, that is representable by a four by four Hermitian matrix. The method may include determining an information metric associated with the signal information, wherein the determination of the information metric includes, determining first derived information associated with performing a first matrix decomposition operation on the four by four Hermitian matrix, where the first derived information is representable by a three by three Hermitian matrix determining the information metric associated with performing a second matrix decomposition operation on the three by three Hermitian matrix transmitting a wireless communication signal associated with the information metric.

Some aspects described herein relate to a non-transitory computer-readable medium that stores a set of instructions for wireless communication by a network node. The set of instructions, when executed by one or more processors of the network node, may cause the network node to receive signal information, associated with a wireless communication signal, that is representable by a four by four Hermitian matrix. The set of instructions, when executed by one or more processors of the network node, may cause the network node to determine an information metric associated with the signal information, wherein the determination of the information metric includes.

Some aspects described herein relate to an apparatus for wireless communication. The apparatus may include means for receiving signal information, associated with a wireless communication signal, that is representable by a four by four Hermitian matrix. The apparatus may include means for determining an information metric associated with the signal information, wherein the determination of the information metric includes, means for determining first derived information associated with performing a first matrix decomposition operation on the four by four Hermitian matrix, where the first derived information is representable by a three by three Hermitian matrix means for determining the information metric associated with performing a second matrix decomposition operation on the three by three Hermitian matrix means for transmitting a wireless communication signal associated with the information metric.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
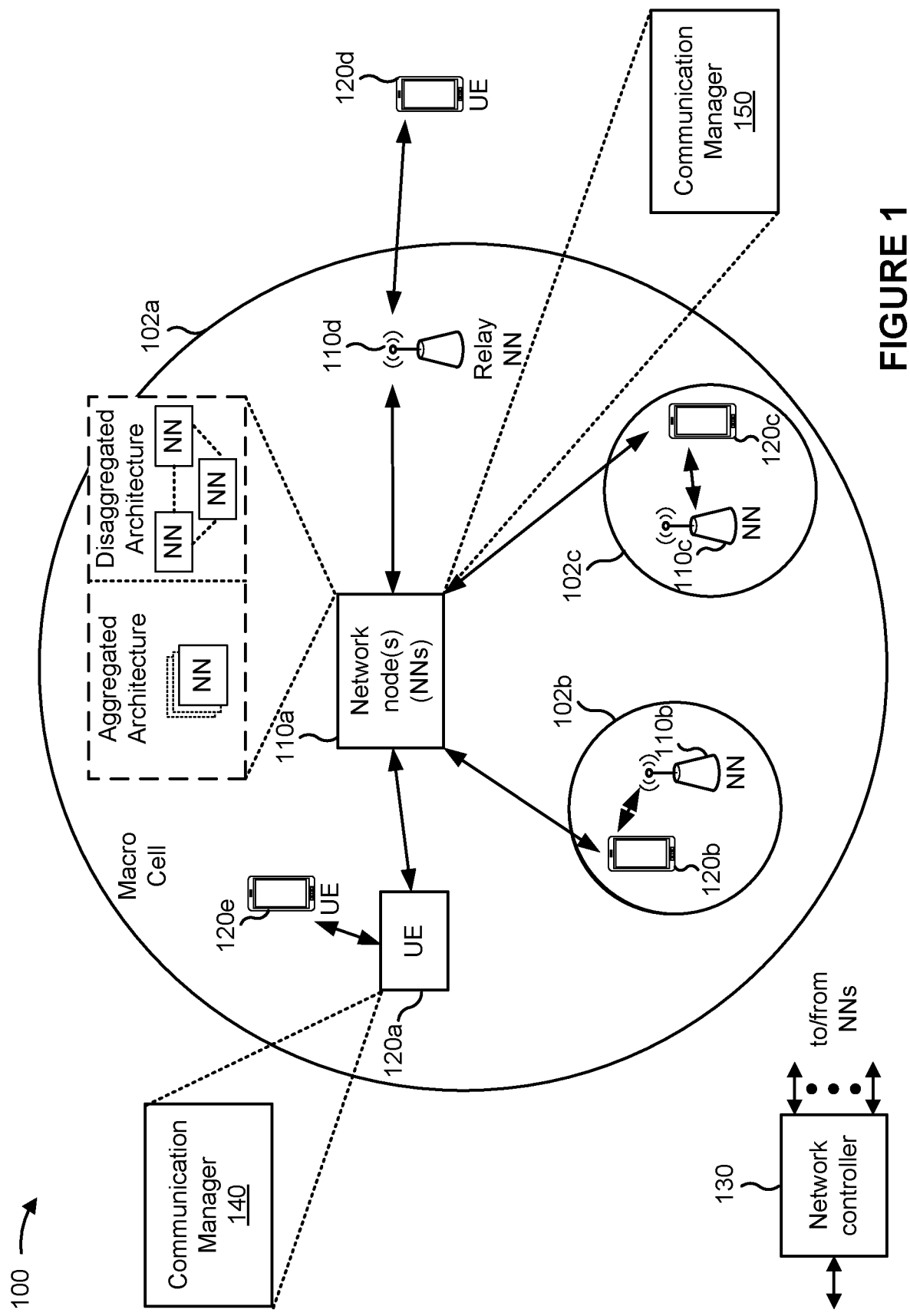
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to performing a two-stage decomposition on a four by four Hermitian matrix associated with a wireless communication signal analysis. In some aspects, a network node may determine information metrics associated with an eigenvalue decomposition (EVD) operation associated with a four by four Hermitian matrix. Some aspects more specifically relate to using information derived (e.g., "derived information") from the four by four Hermitian matrix. The derived information may be representable by a three by three Hermitian matrix. In some examples, the network node may initially determine a scalar (e.g., a single eigenvalue or an approximation thereof) of the four by four Hermitian matrix A. In some examples, the scalar may be determined by solving a quartic equation, by performing a Newton iteration, or by using a power method. For example, in some examples, the network node may determine the characteristic polynomial of the four by four Hermitian matrix A and solve the 4th order polynomial equation with its closed form solution to obtain the eigenvalue. In some other examples, the network node may use a newton iteration or a power method to determine an approximation of the single eigenvalue. In some examples, after determining the scalar, the network node may apply a shifted QR operation where the network node may diagonally shift the four-by-four Hermitian matrix by subtracting the scalar multiplied by an identity matrix to determine a diagonally shifted matrix, $A-\lambda_1 I=QR$, where $\lambda_1$ is the scalar. The network node may perform a QR operation on the diagonally-shifted and matrix to determine $A-\lambda_1 I=QR$. The network node may calculate $$RQ = \begin{bmatrix} B & 0 \\ 0 & 0 \end{bmatrix}$$

and determine an EVD of B by a closed form solution, $B=P_B D_B P_B^H$, where B is a three by three Hermitian matrix. The network node may use a closed form solution in association with eigenvectors of the three by three Hermitian matrix to obtain the eigenvectors of the four by four Hermitian matrix For example, the network node may determine $$U = Q \begin{bmatrix} P_B & 0 \\ 0 & 1 \end{bmatrix}$$

and $$\Sigma = \begin{bmatrix} D_B + \lambda_1 I & 0 \\ 0 & \lambda_1 \end{bmatrix}$$

which contain the eigenvectors and eigenvalues, respectively, of the four by four Hermitian matrix A.

Particular aspects of the subject matter described in this disclosure can be implemented to realize one or more of the following potential advantages. In some examples, the described techniques can be used to reduce the computation complexity of performing an EVD operation a four by four Hermitian matrix and/or to improve the accuracy of performing an EVD operation on a four by four Hermitian matrix.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHz-114.25 GHZ), and FR5 (114.25 GHZ-300 GHz). Each of these higher frequency bands falls within the EHF band.

With the above examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a network node (e.g., the network node 110) may include a communication manager 140 or a communication manager 150. As described in more detail elsewhere herein, the communication manager 140 or 150 may receive signal information, associated with a wireless communication signal, that is representable by a four by four Hermitian matrix; determine an information metric associated with the signal information, wherein the determination of the information metric includes: determine first derived information in association with performing a first matrix decomposition operation on the four by four Hermitian matrix, wherein the first derived information is representable by a three by three Hermitian matrix; and determine the information metric in association with performing a second matrix decomposition operation on the three by three Hermitian matrix; and transmit a wireless communication signal associated with the information metric. Additionally, or alternatively, the communication manager 140 or 150 may perform one or more other operations described herein.

Figure 2:
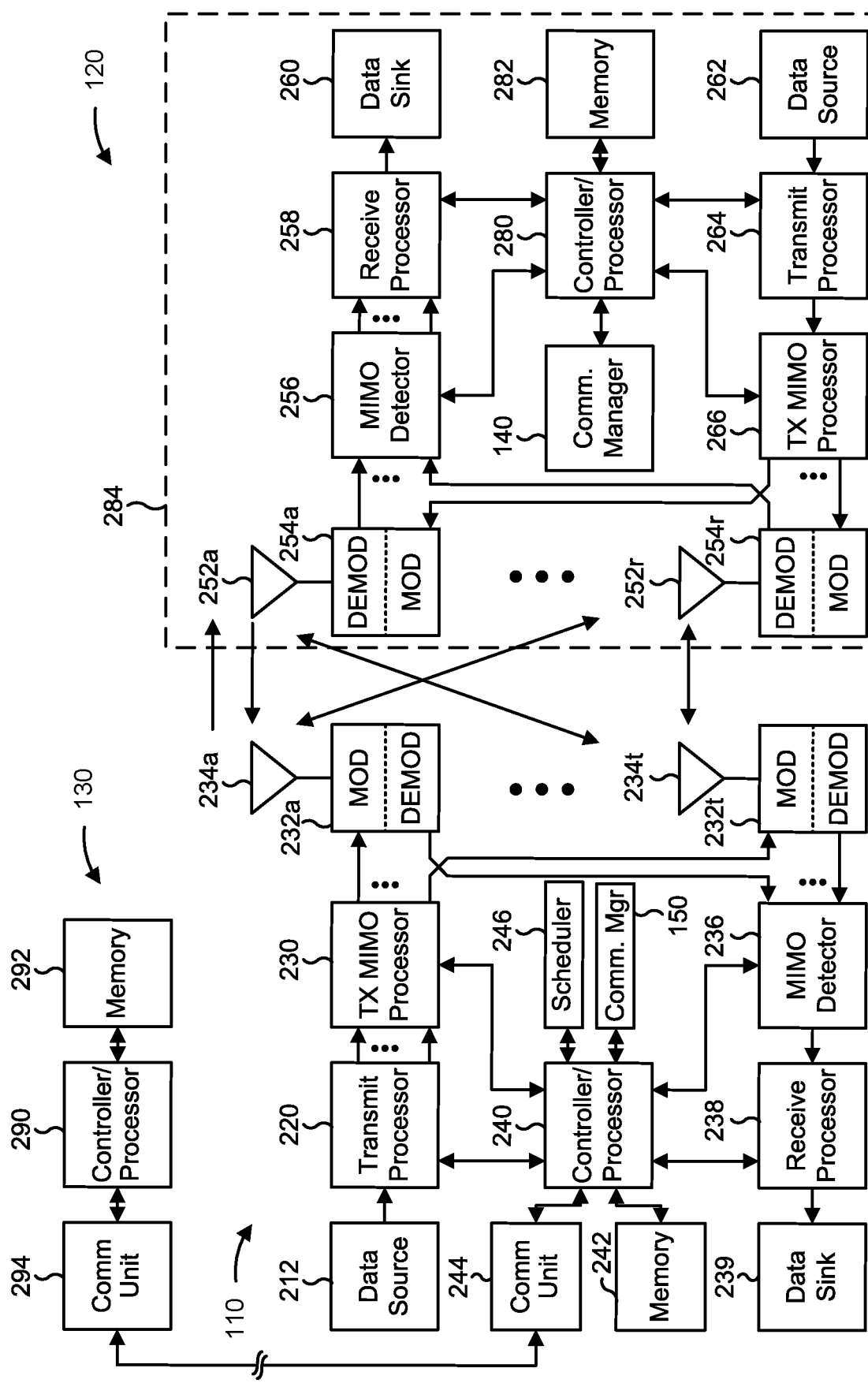
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with performing a two-stage decomposition on a four by four Hermitian matrix associated with a wireless communication signal analysis, as described in more detail elsewhere herein. For example, the controller/processor 240 of the network node 110, the controller/processor 280 of the UE 120, or any other component(s) of FIG. 2 may perform or direct operations of, for example, process 500 of FIG. 5, process 600 of FIG. 6, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 500 of FIG. 5, process 600 of FIG. 6, or other processes as described herein. In some examples, executing instructions May include running the instructions, converting the instructions, compiling the instructions, or interpreting the instructions, among other examples.

In some aspects, a network node (e.g., the network node 110) includes means for receiving signal information, associated with a wireless communication signal, that is representable by a four by four Hermitian matrix; means for determining an information metric associated with the signal information, wherein the determination of the information metric includes: means for determining first derived information in association with performing a first matrix decomposition operation on the four by four Hermitian matrix, wherein the first derived information is representable by a three by three Hermitian matrix; and/or means for determining the information metric in association with performing a second matrix decomposition operation on the three by three Hermitian matrix; and/or means for transmitting a wireless communication signal associated with the information metric. The means for the network node to perform operations described herein may include, for example, one or more of communication manager 140 or 150, transmit processor 220 or 264, TX MIMO processor 230 or 266, modem 232 or 254, antenna 234 or 252, MIMO detector 236 or 256, receive processor 238 or 258, controller/processor 240 or 280, memory 242 or 282, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
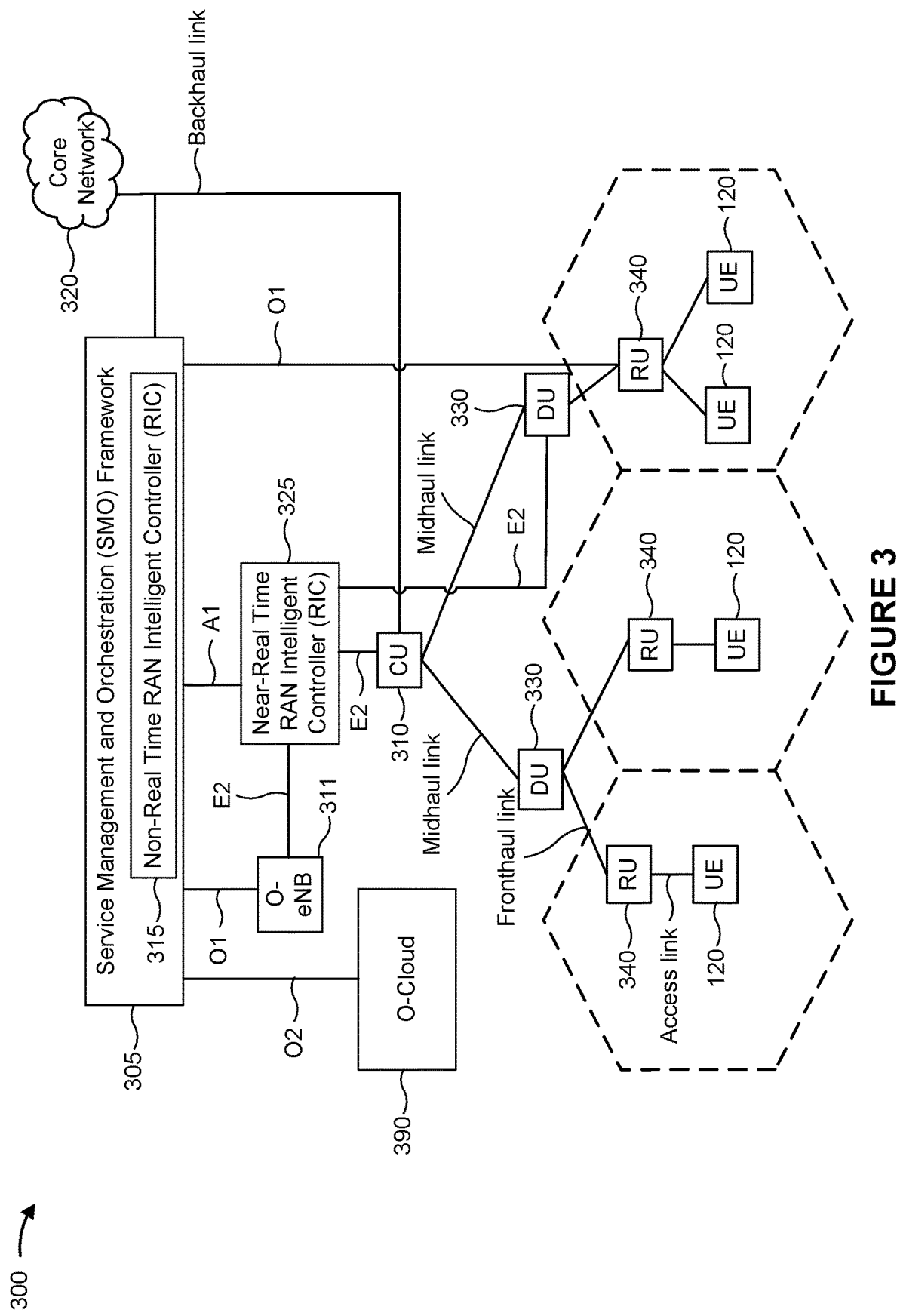
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), and/or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

EVD can be used by network nodes in principal component analysis, transmission beamforming, and/or solving other matrix decompositions (e.g., singular value decomposition (SVD)), among other examples. In some cases, performing an EVD on a four by four matrix can be computationally complex, which may result in undesirable latency. In some cases, performing an EVD on a four by four Hermitian matrix can, as a result of computational complexity, produce inaccurate results.

Various aspects relate generally to determining information metrics associated with an EVD operation associated with a four by four Hermitian matrix. Some aspects more specifically relate to using derived information, representable by a three by three Hermitian matrix, to determine the information metrics. In some aspects, a network node may determine one eigenvalue (or an approximation thereof) of a four by four Hermitian matrix A. In some aspects, the eigenvalue (or approximation thereof) may be determined by either solving a quartic equation, by performing a Newton iteration, or by using a power method. In some aspects, after determining the one eigenvalue (or approximation thereof), the network node may apply a shifted QR operation and use a closed form solution associated with eigenvectors of a three by three Hermitian matrix and a property of a block matrix to obtain the eigenvectors of the four by four matrix. In some aspects, the network node may determine the characteristic polynomial of the four by four Hermitian matrix A and solve the $4^{th}$ order polynomial equation with its closed form solution to obtain eigenvalues. In some aspects, the network node may perform one QR decomposition on $A-\lambda_1 I$ to get $A-\lambda_1 I=QR$, where $\lambda_1$ is any one of the obtained eigenvalues. The network node may calculate $$RQ = \begin{bmatrix} B & 0 \\ 0 & 0 \end{bmatrix}$$

and determine an EVD of B by a closed form solution, $B=P_B D_B P_B^H$, where B is a three by three Hermitian matrix. In some aspects, the network node may determine $$U = Q \begin{bmatrix} P_B & 0 \\ 0 & 1 \end{bmatrix} \text{ and } \Sigma = \begin{bmatrix} D_B + \lambda_1 I & 0 \\ 0 & \lambda_1 \end{bmatrix}$$

which contain the eigenvectors and eigenvalues, respectively, of the four by four Hermitian matrix A.

Particular aspects of the subject matter described in this disclosure can be implemented to realize one or more of the following potential advantages. In some examples, the described techniques can be used to reduce the computation complexity of performing an EVD operation a four by four Hermitian matrix and/or to improve the accuracy of performing an EVD operation a four by four Hermitian matrix.

Figure 4:
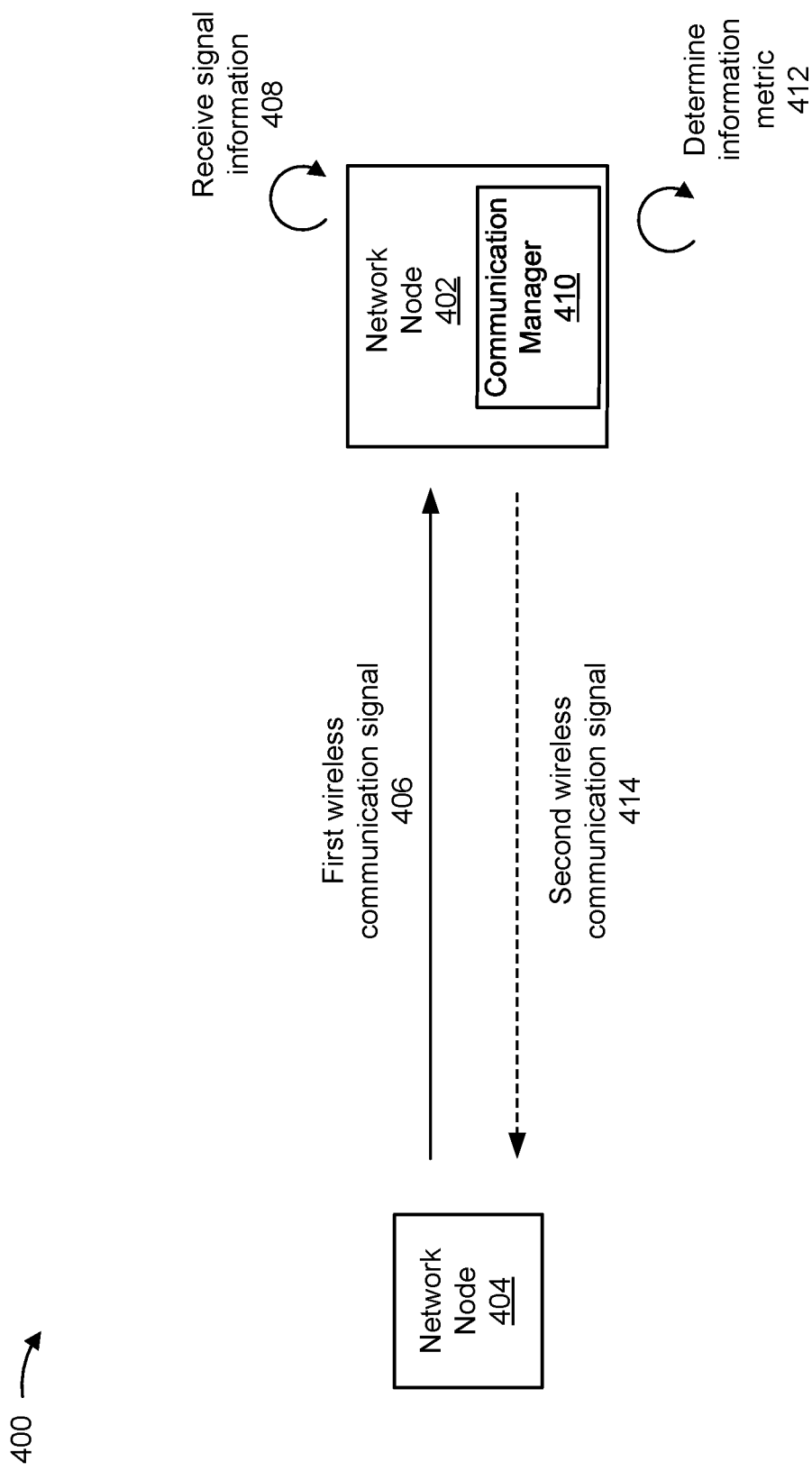
FIG. 4 is a diagram illustrating an example associated with information metrics associated with eigenvalue decomposition for a four by four Hermitian matrix in accordance with the present disclosure.

FIG. 4 is a diagram illustrating an example 400 associated with performing a two-stage decomposition on a four by four Hermitian matrix associated with a wireless communication signal analysis in accordance with the present disclosure. As shown in FIG. 4, a network node 402 (e.g., a UE, a network node 110, a CU, a DU, and/or an RU) may communicate with a network node 404 (e.g., a UE, a network node 110, a CU, a DU, and/or an RU). In some aspects, the network nodes 402 and 404 may be part of a wireless network (e.g., wireless network 100). The network node 402 and the network node 404 may have established a wireless connection prior to operations shown in FIG. 4.

In a first operation 406, the network node 404 may transmit, and the network node 402 may receive, a first wireless communication signal. The wireless communication signal may include a reference signal and/or a data signal. In a second operation 408, a communication manager 410 of the network node 402 may receive signal information associated with the first wireless communication signal. In some aspects, the signal information may be representable by a four by four Hermitian matrix.

In a third operation 412, the network node 402 (e.g., using the communication manager 410) may determine an information metric associated with the signal information. For example, in some aspects, the network node 402 may determine first derived information in association with performing a first matrix decomposition operation on the four by four Hermitian matrix. The first derived information may be representable by a three by three Hermitian matrix. The network node 402 may determine the information metric in association with performing a second matrix decomposition operation on the three by three Hermitian matrix.

In a fourth operation 414, the network node 402 may transmit, and the network node 404 may receive, a second wireless communication signal. The network node 402 may transmit the second wireless communication signal based on the information metric. For example, in some aspects, the information metric may include CSI and/or a measurement associated with a transmission beam for beamforming, and the second wireless communication signal may include the CSI and/or an indication of a beam selected based on the measurement, respectively.

In some aspects, to determine the information metric, a general 4×4 positive definite Hermitian matrix, A can be denoted as:

$$A = \begin{pmatrix} a & e^H & h^H & j^H \\ e & b & f^H & i^H \\ h & f & c & g^H \\ j & i & g & d \end{pmatrix}.$$

In some aspects, then, the four by four Hermitian matrix may be denoted as $A=HH^H \in C^{4\times 4}$. Aspects may include determining, as the information metric, $A=U\Sigma U^H \in C^{4\times 4}$ where $\Sigma$ is a diagonal matrix containing all eigen values of A and U with all eigen vectors.

As indicated above, in some aspects, determining the information metric may include determining first derived information in association with performing a first matrix decomposition operation on the four by four Hermitian matrix. For example, a QR decomposition may be used to perform a block diagonalization of the four by four Hermitian matrix into a three by three Hermitian matrix. The QR decomposition may include decomposing signals (e.g., a channel response) into an orthogonal matrix Q and an upper triangle matrix R that can be used to identify demodulated values (e.g., associated constellation points in an in-phase and quadrature (IQ) plane) of received signal information.

Any of a number of methods for calculating the eigenvalues of A, using the three by three Hermitian matrix, may be used.

Figure 5:
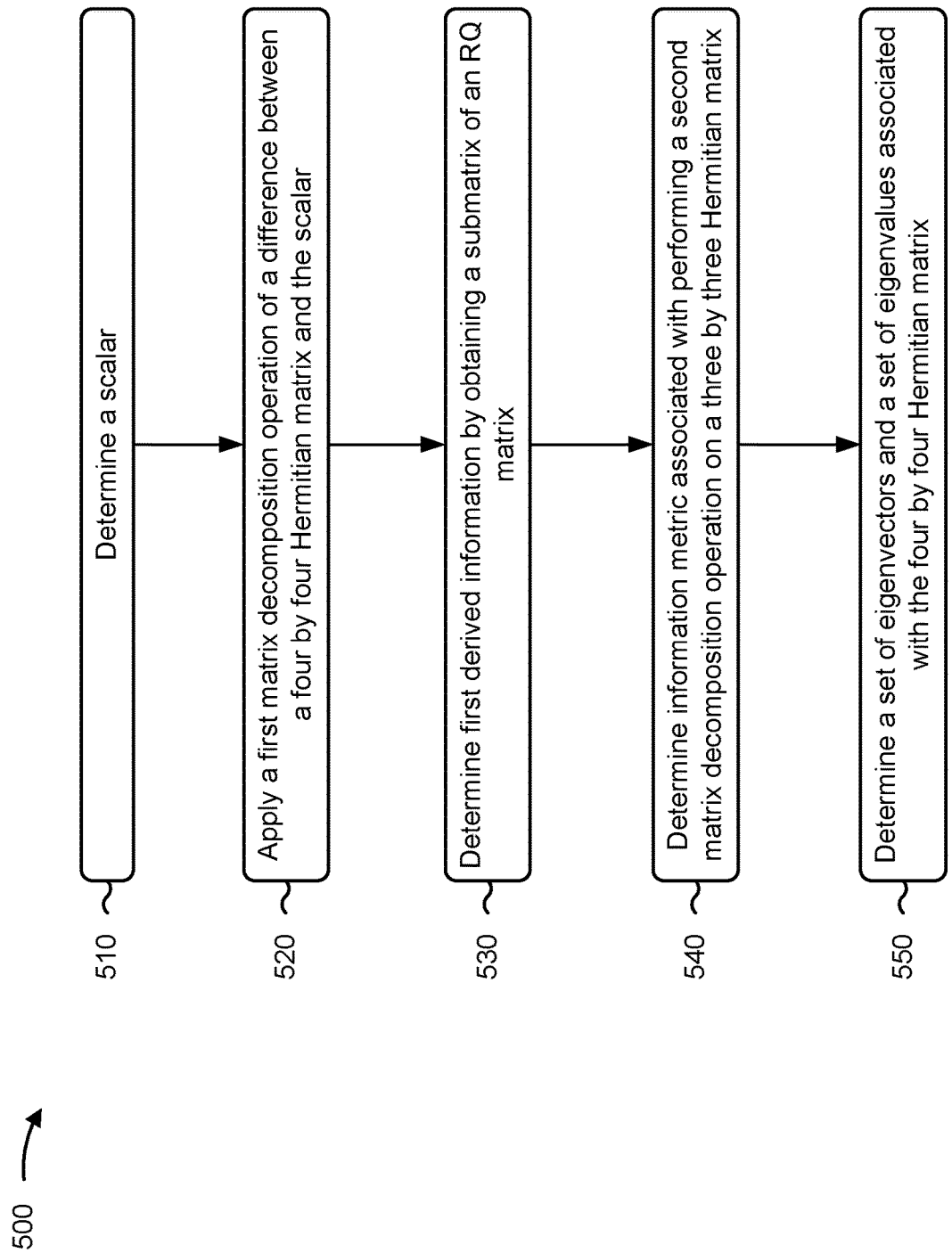
FIG. 5 is a flow diagram illustrating an example process performed, for example, by a network node that supports eigenvalue decomposition (EVD) operations, in accordance with the present disclosure.

FIG. 5 is a flow diagram illustrating an example process 500 performed, for example, by a network node that supports EVD operations in accordance with the present disclosure. Example process 500 is an example where the network node (for example, network node 404) performs operations associated with information metrics associated with eigenvalue decomposition for a four by four Hermitian matrix.

As shown in FIG. 5, in some aspects, process 500 may include determining a scalar (block 510). For example, the network node (such as by using communication manager 708 or reception component 702, depicted in FIG. 7) may determine a scalar.

In some aspects, the scalar may include a single eigenvalue of the four by four Hermitian matrix. In some aspects, determining the scalar comprises determining a closed-form solution to a quartic equation associated with a characteristic polynomial of the four by four Hermitian matrix.

In general, for the following quartic equation, $$x^4 + bx^3 + cx^2 + dx + e = 0,$$

the roots can be obtained by its closed-form solution $$x_{1,2} = -\frac{b}{4a} - S \pm \frac{1}{2}\sqrt{-4S^2 - 2p + \frac{q}{S}}$$

$$x_{3,4} = -\frac{b}{4a} + S \pm \frac{1}{2}\sqrt{-4S^2 - 2p - \frac{q}{S}}$$

Where a=1, and p and q are the coefficients of the second and of the first degree, respectively in the associated depressed quartic $$p = \frac{8ac - 3b^2}{8a^2}$$

$$q = \frac{b^3 - 4abc + 8a^2 d}{8a^3}$$

and where $$S = \frac{1}{2}\sqrt{-\frac{2}{3}p + \frac{1}{3a}\left(Q + \frac{\Delta_0}{Q}\right)}$$

$$Q = \sqrt[3]{\frac{\Delta_1 + \sqrt{\Delta_1^2 - 4\Delta_0^3}}{2}}$$

with $$\Delta_0 = c^2 - 3bd + 12ae$$

$$\Delta_1 = 2c^3 - 9bcd + 27b^2 e + 27ad^2 - 72ace.$$

For example, the network node may calculate the characteristic polynomial of the matrix A as shown:

$$det(A - \lambda I) = \begin{vmatrix} a-\lambda & e^H & h^H & j^H \\ e & b-\lambda & f^H & i^H \\ h & f & c-\lambda & g^H \\ j & i & g & d-\lambda \end{vmatrix} =$$

$$(-e^H j + ia - i\lambda)\left(\left(f^H - \frac{ge}{j}\right)\left(g^H - \frac{(d-\lambda)h}{j}\right) - \right.$$

$$\left(c - \lambda - \frac{gh}{j}\right)\left(i^H - \frac{(d-\lambda)e}{j}\right)\right) -$$

$$(-h^H j + ga - g\lambda)\left(\left(b - \lambda - \frac{ie}{j}\right)\left(g^H - \frac{(d-\lambda)h}{j}\right) - \right.$$

$$\left(f - \frac{ih}{j}\right)\left(i^H - \frac{(d-\lambda)e}{j}\right)\right) + (-j^H j + \lambda^2 -$$

$$(d+a)\lambda + ad)\left(\left(b - \lambda - \frac{ie}{j}\right)\left(c - \lambda - \frac{gh}{j}\right) - \left(f - \frac{ih}{j}\right)\left(f^H - \frac{ge}{j}\right)\right),$$

where $\lambda^4 + k\lambda^3 + m\lambda^2 + n\lambda + p = 0$, and k, m, n, p are derived from the above characteristic polynomial, where j is not equal to zero in the above example. The network node may solve the $4^{th}$ order polynomial equation with its closed form solution to obtain needed eigen values $$\lambda^4 + k\lambda^3 + m\lambda^2 + n\lambda + p = 0.$$

By applying the quartic solution described above, the network node may determine one eigen value of A, e.g., $\lambda_1$.

In some aspects, the scalar may include an approximation of a single eigenvalue of the four by four Hermitian matrix. For example, in some aspects, determining the scalar may include determining a Newton approximation to a quartic equation associated with a characteristic polynomial of the four by four Hermitian matrix. For example, the network node may use Newton iteration to determine the approximation of the single eigenvalue:

$$f(\lambda) = det(A - \lambda I) = (-e^H j + ia - i\lambda)\left(\left(f^H - \frac{ge}{j}\right)\left(g^H - \frac{(d-\lambda)h}{j}\right) - \right.$$

$$\left(c - \lambda - \frac{gh}{j}\right)\left(i^H - \frac{(d-\lambda)e}{j}\right)\right) -$$

$$(-h^H j + ga - g\lambda)\left(\left(b - \lambda - \frac{ie}{j}\right)\left(g^H - \frac{(d-\lambda)h}{j}\right) - \right.$$

$$\left(f - \frac{ih}{j}\right)\left(i^H - \frac{(d-\lambda)e}{j}\right)\right) +$$

$$(-j^H j + \lambda^2 - (d+a)\lambda + ad)\left(\left(b - \lambda - \frac{ie}{j}\right)\left(c - \lambda - \frac{gh}{j}\right) - \right.$$

$$\left(f - \frac{ih}{j}\right)\left(f^H - \frac{ge}{j}\right)\right),$$

where $0 < \lambda min < trace(A)/4$. The derivation function of the characteristic polynomial is:

$$f'(\lambda) = -i\left(\left(f^H - \frac{ge}{j}\right)\left(g^H - \frac{(d-\lambda)h}{j}\right) - \left(c - \lambda - \frac{gh}{j}\right)\left(i^H - \frac{(d-\lambda)e}{j}\right)\right) +$$

$$(-e^H j + ia - i\lambda)\left(\left(f^H - \frac{ge}{j}\right)\left(\frac{h}{j}\right) + \left(i^H - \frac{(d-\lambda)e}{j}\right) - \left(c - \lambda - \frac{gh}{j}\right)\left(\frac{e}{j}\right)\right) +$$

$$g\left(\left(b - \lambda - \frac{ie}{j}\right)\left(g^H - \frac{(d-\lambda)h}{j}\right) - \left(f - \frac{ih}{j}\right)\left(i^H - \frac{(d-\lambda)e}{j}\right)\right) -$$

$$(-h^H j + ga - g\lambda)\left(-\left(g^H - \frac{(d-\lambda)h}{j}\right) + \right.$$

$$\left(b - \lambda - \frac{ie}{j}\right)\frac{h}{j} - \left(f - \frac{ih}{j}\right)\left(\frac{e}{j}\right)\right) +$$

-continued $$(2\lambda - (d+a))\left(\left(b - \lambda - \frac{ie}{j}\right)\left(c - \lambda - \frac{gh}{j}\right) - \left(f - \frac{ih}{j}\right)\left(f^H - \frac{ge}{j}\right)\right) +$$

$$(-j^H j + \lambda^2 - (d+a)\lambda + ad)\left(-\left(c - \lambda - \frac{gh}{j}\right) - \left(b - \lambda - \frac{ie}{j}\right)\right).$$

In the Newton iteration, the network node may pick the initial eigenvalue as 0 to get the minimum eigen value since the minimum eigen value of A is larger than 0:

$$\lambda_1 = 0$$

$$\lambda_{n+1} = \lambda_n - \frac{f(\lambda_n)}{f'(\lambda_n)}.$$

In some aspects, determining the scalar may include determining, using a power method operation, an approximate of the largest eigenvalue of the four by four Hermitian matrix. For example, in some aspects, the network node may randomly set an initial vector $x_0$ and determine $$Ax_0 = A\Sigma_k \alpha_k v_k = \Sigma_k \alpha_k \lambda_k v_k$$

and $$A^m x_0 = AA^{m-1} x_0 = \Sigma_k \alpha_k \lambda_k^m v_k \approx \alpha_1 \lambda_1^m v_1,$$

where $\lambda_1$ is the largest eigen value of A and $$v_1 \approx \frac{A^m x_0}{|A^m x_0|}.$$

Then, the largest eigenvalue may be approximated as: $\lambda_1 \approx v'_1 * A * v_1$. In some aspects, to save computation resource consumption, the $A^m x_0$ may be sequentially calculated by first calculating $A^{m-1} x_0$, then $AA^{m-1} x_0$. In some aspects, the initial vector may be, for example, $x_0 = [1\ 0\ 0\ 0]^H$.

As further shown in FIG. 5, in some aspects, process 500 may include applying a first matrix decomposition operation on a difference between a four by four Hermitian matrix and the scalar (block 520). For example, the network node (such as by using communication manager 708, depicted in FIG. 7) may apply the first matrix decomposition operation on a difference between a four by four Hermitian matrix and the scalar. In some aspects, the first matrix decomposition may include a QR decomposition. For example, the network node may apply a first matrix decomposition operation (e.g., a QR decomposition operation) on A, $A-\lambda_1 I = QR$, where the right bottom item of R is zero or close to zero (e.g., within a specified threshold of zero) to obtain $$Q^H AQ - \lambda_1 I = RQ.$$

As further shown in FIG. 5, in some aspects, process 500 may include determining the first derived information by obtaining a submatrix of the RQ matrix (block 530). For example, the network node (such as by using communication manager 708, depicted in FIG. 7) may determine the first derived information by obtaining a submatrix of the RQ matrix. The first derived information may be representable by a three by three Hermitian matrix. In some aspects, the three by three Hermitian matrix comprises a submatrix of a product of an upper triangular matrix associated with the four by four Hermitian matrix multiplied by an orthogonal matrix associated with the four by four Hermitian matrix. For example, since RQ is a block diagonal matrix of rank 3 (due to the diagonal shift) with following form:

$$RQ = \begin{bmatrix} B & 0 \\ 0 & 0 \end{bmatrix},$$

where B is a 3×3 Hermitian matrix, the first derived information may include B. In some aspects, a bottom right element of the upper triangular matrix, R, is a zero. In some aspects, a bottom right element of the upper triangular matrix, R, is a value defined such that a difference between the value and zero satisfies a threshold.

As further shown in FIG. 5, in some aspects, process 500 may include determining the information metric associated with performing a second matrix decomposition operation on the three by three Hermitian matrix (block 540). For example, the network node (such as by using communication manager 708, depicted in FIG. 7) may determine the information metric in association with performing a second matrix decomposition operation on the three by three Hermitian matrix. In some aspects, performing the second matrix decomposition comprises performing an EVD operation. In some aspects, performing the EVD includes performing the EVD operation associated with the three by three Hermitian matrix using a closed form solution operation.

For example, the network node may determine the EVD of $B = P_B D_B P_B^H$ using the closed form solution of the three by three Hermitian matrix. If C is the three by three Hermitian matrix, its eigenvalues and eigenvectors may be written as:

$$C = \begin{pmatrix} a & d^H & f^H \\ d & b & e^H \\ f & e & c \end{pmatrix} = (v_1\ v_2\ v_3) \begin{pmatrix} \lambda_1 & 0 & 0 \\ 0 & \lambda_2 & 0 \\ 0 & 0 & \lambda_3 \end{pmatrix} (v_1\ v_2\ v_3)^H.$$

The eigenvalues of C are:

$$\begin{cases} \lambda_1 = [a+b+c - 2\sqrt{x_1} \cos(\varphi/3)]/3 \\ \lambda_2 = [a+b+c + 2\sqrt{x_1} \cos((\varphi-\pi)/3)]/3, \\ \lambda_3 = [a+b+c + 2\sqrt{x_1} \cos((\varphi+\pi)/3)]/3 \end{cases}$$

where $$\begin{cases} x_1 = a^2 + b^2 + c^2 - ab - ac - bc + 3(|d|^2 + |e|^2 + |f|^2) \\ x_2 = -(2a-b-c)(2b-a-c)(2c-a-b)e + \\ 9[(2c-a-b)|d|^2 + (2b-a-c)|f|^2 + (2a-b-c)|e|^2] - 54\mathrm{Re}(d^H e^H f) \end{cases},$$

and $$\varphi = \begin{cases} \mathrm{atan}\left(\frac{\sqrt{4x_1^3 - x_2^2}}{x_2}\right), & \text{if } x_2 > 0 \\ \lambda_2 = \frac{\pi}{2}, & \text{if } x_2 = 0 \\ \mathrm{atan}\left(\frac{\sqrt{4x_1^3 - x_2^2}}{x_2}\right) + \pi, & \text{if } x_2 < 0 \end{cases}.$$

The eigenvectors of C are:

$$v_1 = \begin{cases} (\lambda_1 - c)(f(b-\lambda_1) - de) - e \cdot m_1 \\ m_1 f \\ f(f(b-\lambda_1) - de) \end{cases},$$

$$v_2 = \begin{cases} (\lambda_2 - c)(f(b-\lambda_2) - de) - e \cdot m_2 \\ m_2 f \\ f(f(b-\lambda_2) - de) \end{cases},$$

$$v_3 = \begin{cases} (\lambda_3 - c)(f(b-\lambda_3) - de) - e \cdot m_3 \\ m_3 f \\ f(f(b-\lambda_3) - de) \end{cases},$$

where $$\begin{cases} m_1 = d(c-\lambda_1) - e^H f, \\ m_2 = d(c-\lambda_2) - e^H f, \\ m_3 = d(c-\lambda_3) - e^H f \end{cases}.$$

As further shown in FIG. 5, in some aspects, process 500 may include determining a set of eigenvectors associated with the four by four Hermitian matrix and a set of eigenvalues associated with the four by four Hermitian matrix (block 550). For example, the network node (such as by using communication manager 708, depicted in FIG. 7) may determine a set of eigenvectors associated with the four by four Hermitian matrix and a set of eigenvalues associated with the four by four Hermitian matrix.

For example, in some aspects, the network node 402 may represent RQ as $$RQ = \begin{bmatrix} P_B & 0 \\ 0 & 1 \end{bmatrix} \begin{bmatrix} D_B & 0 \\ 0 & 0 \end{bmatrix} \begin{bmatrix} P_B & 0 \\ 0 & 1 \end{bmatrix}^H = Q^H A Q - \lambda_1 I,$$

which may be rewritten as $$A = Q \begin{bmatrix} P_B & 0 \\ 0 & 1 \end{bmatrix} \begin{bmatrix} D_B + \lambda_1 I & 0 \\ 0 & \lambda_1 \end{bmatrix} \begin{bmatrix} P_B & 0 \\ 0 & 1 \end{bmatrix}^H Q^H.$$

In this way, the network node may determine all of the eigenvectors of A, which may be included in columns of a matrix, U:

$$U = Q \begin{bmatrix} P_B & 0 \\ 0 & 1 \end{bmatrix}$$

corresponding to eigenvalues of diagonal items of a matrix, Σ:

$$\Sigma = \begin{bmatrix} D_B + \lambda_1 I & 0 \\ 0 & \lambda_1 \end{bmatrix}.$$

Figure 6:
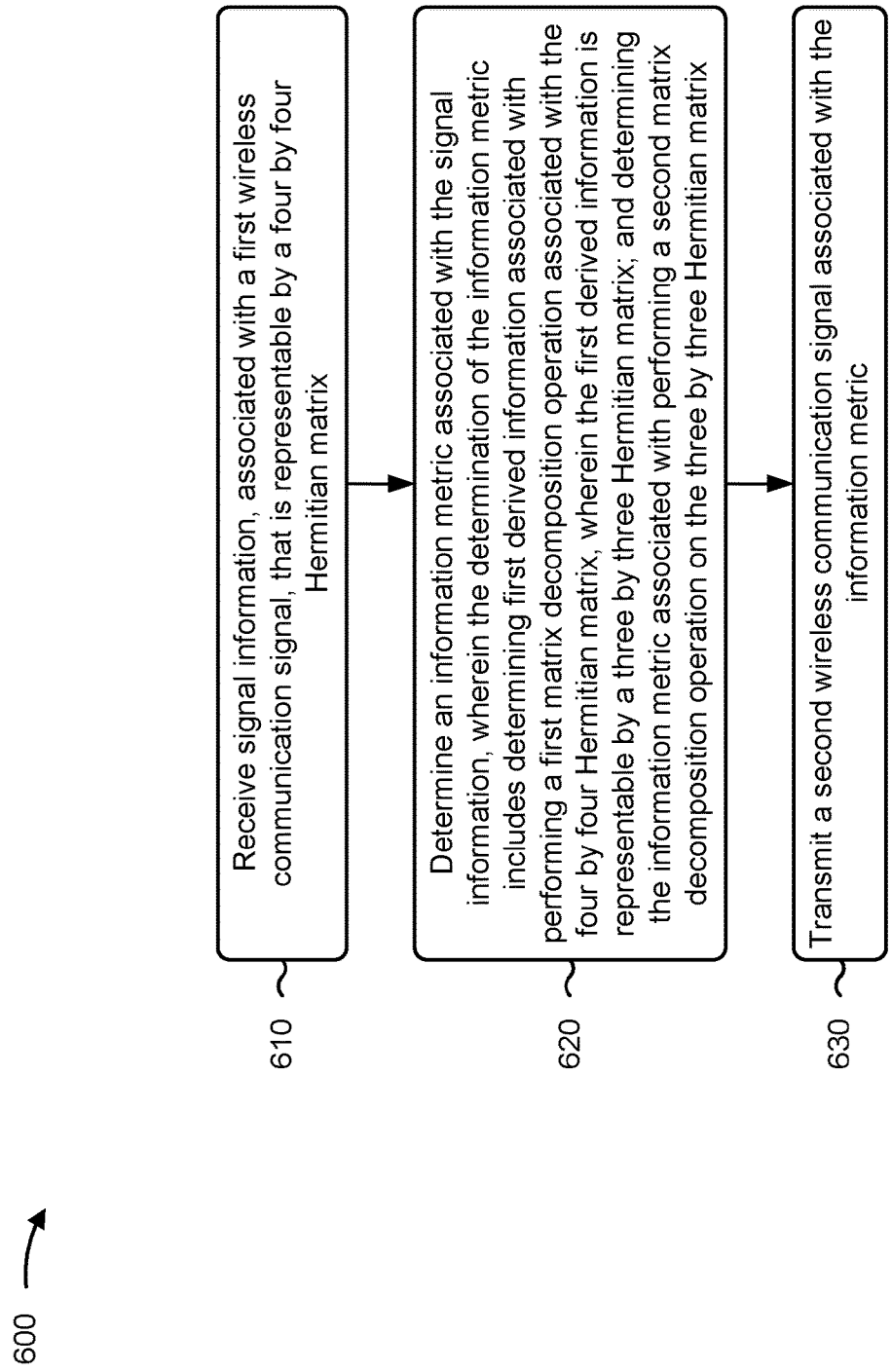
FIG. 6 is a flowchart illustrating an example process performed, for example, by a network node that supports EVD operations in accordance with the present disclosure.

FIG. 6 is a flowchart illustrating an example process 600 performed, for example, by a network node that supports EVD operations in accordance with the present disclosure. Example process 600 is an example where the network node (for example, network node 402) performs operations associated with information metrics associated with EVD for a four by four Hermitian matrix.

As shown in FIG. 6, in some aspects, process 600 may include receiving signal information, associated with a first wireless communication signal, that is representable by a four by four Hermitian matrix (block 610). For example, the network node (such as by using communication manager 708 or reception component 702, depicted in FIG. 7) may receive signal information, associated with a first wireless communication signal, that is representable by a four by four Hermitian matrix, as described above.

As further shown in FIG. 6, in some aspects, process 600 may include determining an information metric associated with the signal information, where the determination of the information metric includes determining first derived information in association with performing a first matrix decomposition operation associated with the four by four Hermitian matrix, wherein the first derived information is representable by a three by three Hermitian matrix; and determining the information metric in association with performing a second matrix decomposition operation on the three by three Hermitian matrix (block 620). For example, the network node (such as by using communication manager 708, depicted in FIG. 7) may determine an information metric associated with the signal information, wherein the determination of the information metric includes determining first derived information in association with performing a first matrix decomposition operation associated with the four by four Hermitian matrix, wherein the first derived information is representable by a three by three Hermitian matrix; and determining the information metric associated with performing a second matrix decomposition operation on the three by three Hermitian matrix, as described above.

As further shown in FIG. 6, in some aspects, process 600 may include transmitting a second wireless communication signal associated with the information metric (block 630). For example, the network node (such as by using communication manager 708 or transmission component 704, depicted in FIG. 7) may transmit a second wireless communication signal associated with the information metric, as described above.

Process 600 may include additional aspects, such as any single aspect or any combination of aspects described below or in connection with one or more other processes described elsewhere herein.

In a first additional aspect, determining the first derived information includes determining a scalar and applying the first matrix decomposition operation on a difference between the four by four Hermitian matrix and the scalar. In a second additional aspect, alone or in combination with the first aspect, the scalar comprises a single eigenvalue of the four by four Hermitian matrix. In a third additional aspect, alone or in combination with one or more of the first and second aspects, the scalar comprises an approximation of a single eigenvalue of the four by four Hermitian matrix.

In a fourth additional aspect, alone or in combination with the first aspect, determining the scalar comprises determining a closed-form solution to a quartic equation associated with a characteristic polynomial of the four by four Hermitian matrix. In a fifth additional aspect, alone or in combination with one or more of the first or fourth aspects, determining the scalar comprises determining a Newton approximation to a quartic equation associated with a characteristic polynomial of the four by four Hermitian matrix. In a sixth additional aspect, alone or in combination with one or more of the first or fourth aspects, determining the scalar comprises determining, using a power method operation, an approximation of a largest eigenvalue of the four by four Hermitian matrix.

In a seventh additional aspect, alone or in combination with one or more of the first through sixth aspects, the first matrix decomposition comprises a QR decomposition. In an eighth additional aspect, alone or in combination with one or more of the first through seventh aspects, performing the second matrix decomposition comprises performing an EVD operation. In a ninth additional aspect, alone or in combination with the eighth aspect, performing the EVD includes performing the EVD operation in association with the three by three Hermitian matrix using a closed form solution operation.

In a tenth additional aspect, alone or in combination with the ninth aspect, performing the EVD includes performing the EVD operation in association with the three by three Hermitian matrix using a closed form solution operation. In an eleventh additional aspect, alone or in combination with the tenth aspect, a bottom right element of the upper triangular matrix is a zero. In a twelfth additional aspect, alone or in combination with the tenth aspect, a bottom right element of the upper triangular matrix comprises a value defined such that a difference between the value and zero satisfies a threshold. In a thirteenth additional aspect, alone or in combination with one or more of the first through twelfth aspects, the information metric comprises a set of eigenvectors associated with the four by four Hermitian matrix and a set of eigenvalues associated with the four by four Hermitian matrix.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
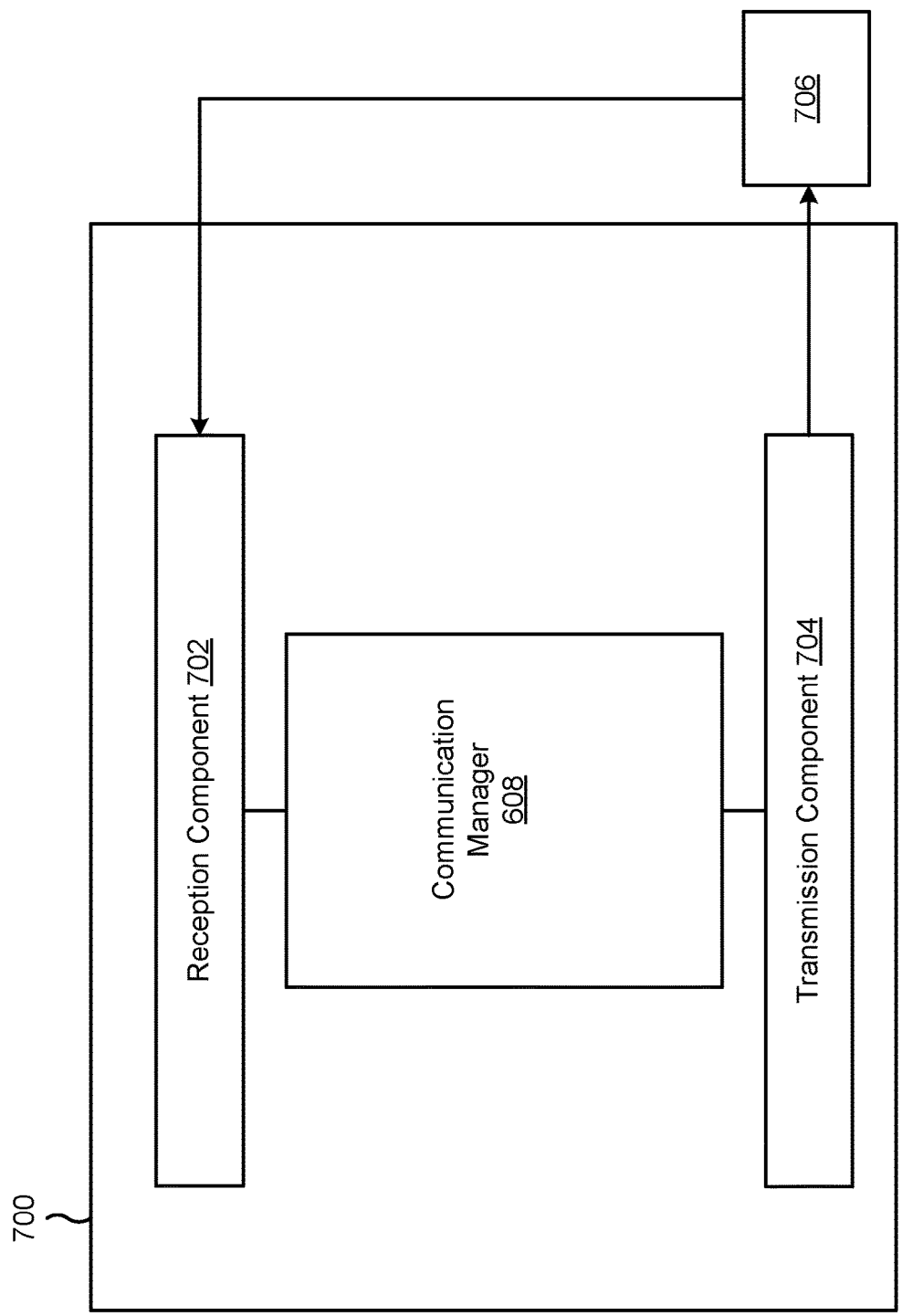
FIG. 7 is a diagram of an example apparatus for wireless communication that supports EVD operations in accordance with the present disclosure.

FIG. 7 is a diagram of an example apparatus 700 for wireless communication that supports EVD operations in accordance with the present disclosure. The apparatus 700 may be a network node, or a network node may include the apparatus 700. In some aspects, the apparatus 700 includes a reception component 702, a transmission component 704, and a communication manager 708, which may be in communication with one another (for example, via one or more buses). As shown, the apparatus 700 may communicate with another apparatus 706 (such as a UE, a network node, or another wireless communication device) using the reception component 702 and the transmission component 704.

In some aspects, the apparatus 700 may be configured to and/or operable to perform one or more operations described herein in connection with FIG. 4. Additionally or alternatively, the apparatus 700 may be configured to and/or operable to perform one or more processes described herein, such as process 500 of FIG. 5, and/or process 600 of FIG. 6. In some aspects, the apparatus 700 may include one or more components of the network node described above in connection with FIG. 2.

The reception component 702 may receive communications, such as reference signals, control information, and/or data communications, from the apparatus 706. The reception component 702 may provide received communications to one or more other components of the apparatus 700, such as the communication manager 708. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, and/or a memory of the UE and/or the network node described above in connection with FIG. 2.

The transmission component 704 may transmit communications, such as reference signals, control information, and/or data communications, to the apparatus 706. In some aspects, the communication manager 708 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, and/or a memory of the UE and/or the network node described above in connection with FIG. 2. In some aspects, the transmission component 704 may be co-located with the reception component 702 in a transceiver.

The communication manager 708 may receive or may cause the reception component 702 to receive signal information, associated with a first wireless communication signal, that is representable by a four by four Hermitian matrix. The communication manager 708 may determine an information metric associated with the signal information, wherein the determination of the information metric includes determining first derived information in association with performing a first matrix decomposition operation associated with the four by four Hermitian matrix, wherein the first derived information is representable by a three by three Hermitian matrix; and determining the information metric in association with performing a second matrix decomposition operation on the three by three Hermitian matrix. The communication manager 708 may transmit or may cause the transmission component 704 to transmit a second wireless communication signal associated with the information metric. In some aspects, the communication manager 708 may perform one or more operations described elsewhere herein as being performed by one or more components of the communication manager 708.

The communication manager 708 may include a controller/processor, a memory, a scheduler, and/or a communication unit of the network node described above in connection with FIG. 2. In some aspects, the communication manager 708 includes a set of components. Alternatively, the set of components may be separate and distinct from the communication manager 708. In some aspects, one or more components of the set of components may include or may be implemented within a controller/processor, a memory, a scheduler, and/or a communication unit of the UE and/or the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive signal information, associated with a first wireless communication signal, that is representable by a four by four Hermitian matrix. The communication manager 708 may determine an information metric associated with the signal information, wherein the determination of the information metric includes determining first derived information in association with performing a first matrix decomposition operation associated with the four by four Hermitian matrix, wherein the first derived information is representable by a three by three Hermitian matrix; and determining the information metric in association with performing a second matrix decomposition operation on the three by three Hermitian matrix. The transmission component 704 may transmit a second wireless communication signal associated with the information metric.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a network node, comprising: receiving signal information, associated with a first wireless communication signal, that is representable by a four by four Hermitian matrix; determining an information metric associated with the signal information, wherein the determination of the information metric includes: determining first derived information in association with performing a first matrix decomposition operation associated with the four by four Hermitian matrix, wherein the first derived information is representable by a three by three Hermitian matrix; and determining the information metric in association with performing a second matrix decomposition operation on the three by three Hermitian matrix; and transmitting a second wireless communication signal associated with the information metric.

Aspect 2: The method of Aspect 1, wherein determining the first derived information includes determining a scalar and applying the first matrix decomposition operation on a difference between the four by four Hermitian matrix and the scalar.

Aspect 3: The method of Aspect 2, wherein the scalar comprises a single eigenvalue of the four by four Hermitian matrix.

Aspect 4: The method of either of Aspects 2 or 3, wherein determining the scalar comprises determining a closed-form solution to a quartic equation associated with a characteristic polynomial of the four by four Hermitian matrix.

Aspect 5: The method of Aspect 2, wherein the scalar comprises an approximation of a single eigenvalue of the four by four Hermitian matrix.

Aspect 6: The method of either of Aspects 2 or 5, wherein determining the scalar comprises determining a Newton approximation to a quartic equation associated with a characteristic polynomial of the four by four Hermitian matrix.

Aspect 7: The method of either of Aspects 2 or 5, wherein determining the scalar comprises determining, using a power method operation, a largest approximate eigenvalue of the four by four Hermitian matrix.

Aspect 8: The method of any of Aspects 1-7, wherein the first matrix decomposition comprises a QR decomposition.

Aspect 9: The method of any of Aspects 1-8, wherein performing the second matrix decomposition comprises performing an eigenvalue decomposition (EVD) operation.

Aspect 10: The method of Aspect 9, wherein performing the EVD includes performing the EVD operation in association with the three by three Hermitian matrix using a closed form solution operation.

Aspect 11: The method of any of Aspects 1-10, wherein the three by three Hermitian matrix comprises a submatrix of a product of an upper triangular matrix associated with the four by four Hermitian matrix multiplied by an orthogonal matrix associated with the four by four Hermitian matrix.

Aspect 12: The method of Aspect 11, wherein a bottom right element of the upper triangular matrix is a zero.

Aspect 13: The method of any of Aspects 11-12, wherein a bottom right element of the upper triangular matrix comprises a value defined such that a difference between the value and zero satisfies a threshold.

Aspect 14: The method of any of Aspects 1-13, wherein the information metric comprises a set of eigenvectors associated with the four by four Hermitian matrix and a set of eigenvalues associated with the four by four Hermitian matrix.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A network node for wireless communication, comprising:
   at least one memory; and
   at least one processor communicatively coupled with the at least one memory, the at least one processor operable to cause the network node to:
      receive signal information, associated with a wireless communication signal, that is representable by a four by four Hermitian matrix;
      determine an information metric associated with the signal information, wherein the determination of the information metric includes:
         determining first derived information in association with performing a first matrix decomposition operation on the four by four Hermitian matrix, wherein the first derived information is representable by a three by three Hermitian matrix; and
         determining the information metric in association with performing a second matrix decomposition operation on the three by three Hermitian matrix; and
      transmit a wireless communication signal associated with the information metric.

2. The network node of claim 1, wherein, to cause the network node to determine the first derived information, the at least one processor is operable to cause the network node to determine a scalar and apply the first matrix decomposition operation on a difference between the four by four Hermitian matrix and the scalar.

3. The network node of claim 2, wherein the scalar comprises a single eigenvalue of the four by four Hermitian matrix.

4. The network node of claim 2, wherein, to cause the network node to determine the scalar, the at least one processor is operable to cause the network node to determine a closed-form solution to a quartic equation associated with a characteristic polynomial of the four by four Hermitian matrix.

5. The network node of claim 2, wherein the scalar comprises an approximation of a single eigenvalue of the four by four Hermitian matrix.

6. The network node of claim 2, wherein, to cause the network node to determine the scalar, the at least one processor is operable to cause the network node to determine a Newton approximation to a quartic equation associated with a characteristic polynomial of the four by four Hermitian matrix.

7. The network node of claim 2, wherein, to cause the network node to determine the scalar, the at least one processor is operable to cause the network node to determine, using a power method operation, an approximate of a largest eigenvalue of the four by four Hermitian matrix.

8. The network node of claim 1, wherein the first matrix decomposition comprises a QR decomposition.

9. The network node of claim 1, wherein, to cause the network node to perform the second matrix decomposition, the at least one processor is operable to cause the network node to perform an eigenvalue decomposition (EVD) operation.

10. The network node of claim 1, wherein, to cause the network node to perform the EVD operation, the at least one processor is operable to cause the network node to perform the EVD operation in association with the three by three Hermitian matrix using a closed form solution operation.

11. The network node of claim 1, wherein the three by three Hermitian matrix comprises a submatrix of a product of an upper triangular matrix associated with the four by four Hermitian matrix multiplied by an orthogonal matrix associated with the four by four Hermitian matrix, wherein a bottom right element of the upper triangular matrix is a zero.

12. The network node of claim 1, wherein the three by three Hermitian matrix comprises a submatrix of a product of an upper triangular matrix associated with the four by four Hermitian matrix multiplied by an orthogonal matrix associated with the four by four Hermitian matrix, wherein a bottom right element of the upper triangular matrix comprises a value defined such that a difference between the value and zero satisfies a threshold.

13. The network node of claim 1, wherein the information metric comprises a set of eigenvectors associated with the four by four Hermitian matrix and a set of eigenvalues associated with the four by four Hermitian matrix.

14. A method of wireless communication performed by a network node, comprising:
   receiving signal information, associated with a wireless communication signal, that is representable by a four by four Hermitian matrix;

determining an information metric associated with the signal information, wherein the determination of the information metric includes:
- determining first derived information in association with performing a first matrix decomposition operation on the four by four Hermitian matrix, wherein the first derived information is representable by a three by three Hermitian matrix; and
- determining the information metric in association with performing a second matrix decomposition operation on the three by three Hermitian matrix; and transmitting a wireless communication signal associated with the information metric.

15. The method of claim 14, wherein determining the first derived information includes determining a scalar and applying the first matrix decomposition operation on a difference between the four by four Hermitian matrix and the scalar.

16. The method of claim 15, wherein the scalar comprises a single eigenvalue of the four by four Hermitian matrix.

17. The method of claim 16, wherein determining the scalar comprises determining a closed-form solution to a quartic equation associated with a characteristic polynomial of the four by four Hermitian matrix.

18. The method of claim 15, wherein the scalar comprises an approximation of a single eigenvalue of the four by four Hermitian matrix.

19. The method of claim 18, wherein determining the scalar comprises determining a Newton approximation to a quadratic equation associated with a characteristic polynomial of the four by four Hermitian matrix.

20. The method of claim 18, wherein determining the scalar comprises determining, using a power method operation, an approximate of a largest eigenvalue of the four by four Hermitian matrix.

21. The method of claim 14, wherein the first matrix decomposition comprises a QR decomposition.

22. The method of claim 14, wherein performing the second matrix decomposition comprises performing an eigenvalue decomposition (EVD) operation.

23. The method of claim 22, wherein performing the EVD includes performing the EVD operation in association with the three by three Hermitian matrix using a closed form solution operation.

24. The method of claim 14, wherein the three by three Hermitian matrix comprises a submatrix of a product of an upper triangular matrix associated with the four by four Hermitian matrix multiplied by an orthogonal matrix associated with the four by four Hermitian matrix, wherein a bottom right element of the upper triangular matrix is a zero.

25. The method of claim 14, wherein the three by three Hermitian matrix comprises a submatrix of a product of an upper triangular matrix associated with the four by four Hermitian matrix multiplied by an orthogonal matrix associated with the four by four Hermitian matrix, wherein a bottom right element of the upper triangular matrix comprises a value defined such that a difference between the value and zero satisfies a threshold.

26. The method of claim 14, wherein the information metric comprises a set of eigenvectors associated with the four by four Hermitian matrix and a set of eigenvalues associated with the four by four Hermitian matrix.

27. An apparatus for wireless communication, comprising:
- means for receiving signal information, associated with a wireless communication signal, that is representable by a four by four Hermitian matrix;
- means for determining an information metric associated with the signal information, wherein the determination of the information metric includes:
  - means for determining first derived information in association with performing a first matrix decomposition operation on the four by four Hermitian matrix, wherein the first derived information is representable by a three by three Hermitian matrix; and
  - means for determining the information metric in association with performing a second matrix decomposition operation on the three by three Hermitian matrix; and
- means for transmitting a wireless communication signal associated with the information metric.

* * * * *